No. 756,982. PATENTED APR. 12, 1904.
E. M. ROBINSON.
VARIABLE POWER LIFTING JACK.
APPLICATION FILED APR. 6, 1901.
NO MODEL. 6 SHEETS—SHEET 3.
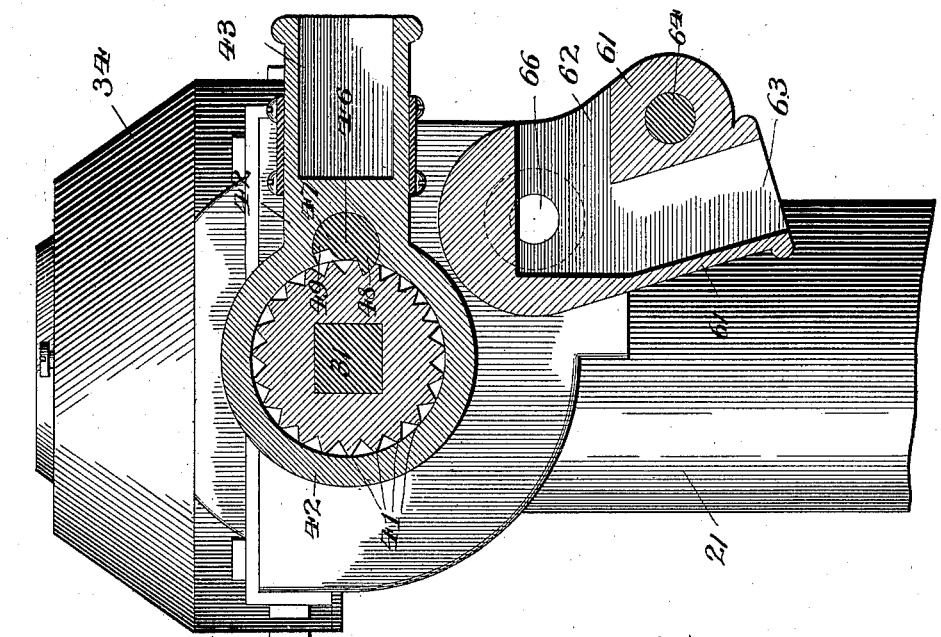
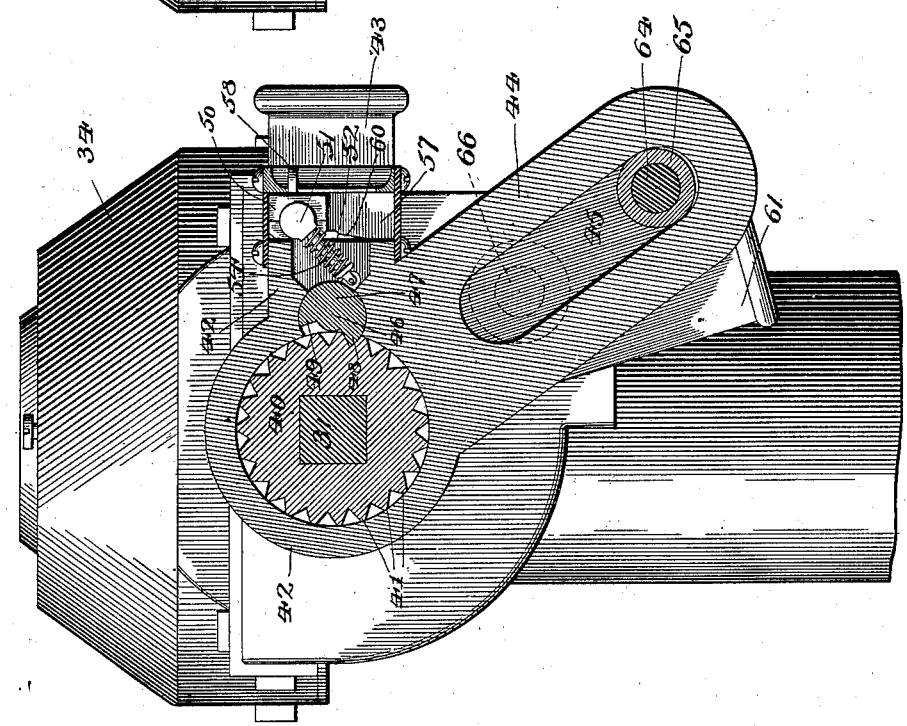
Witnesses:
Inventor:
Eugene M. Robinson,
By Dwight B. Cheever
Atty.

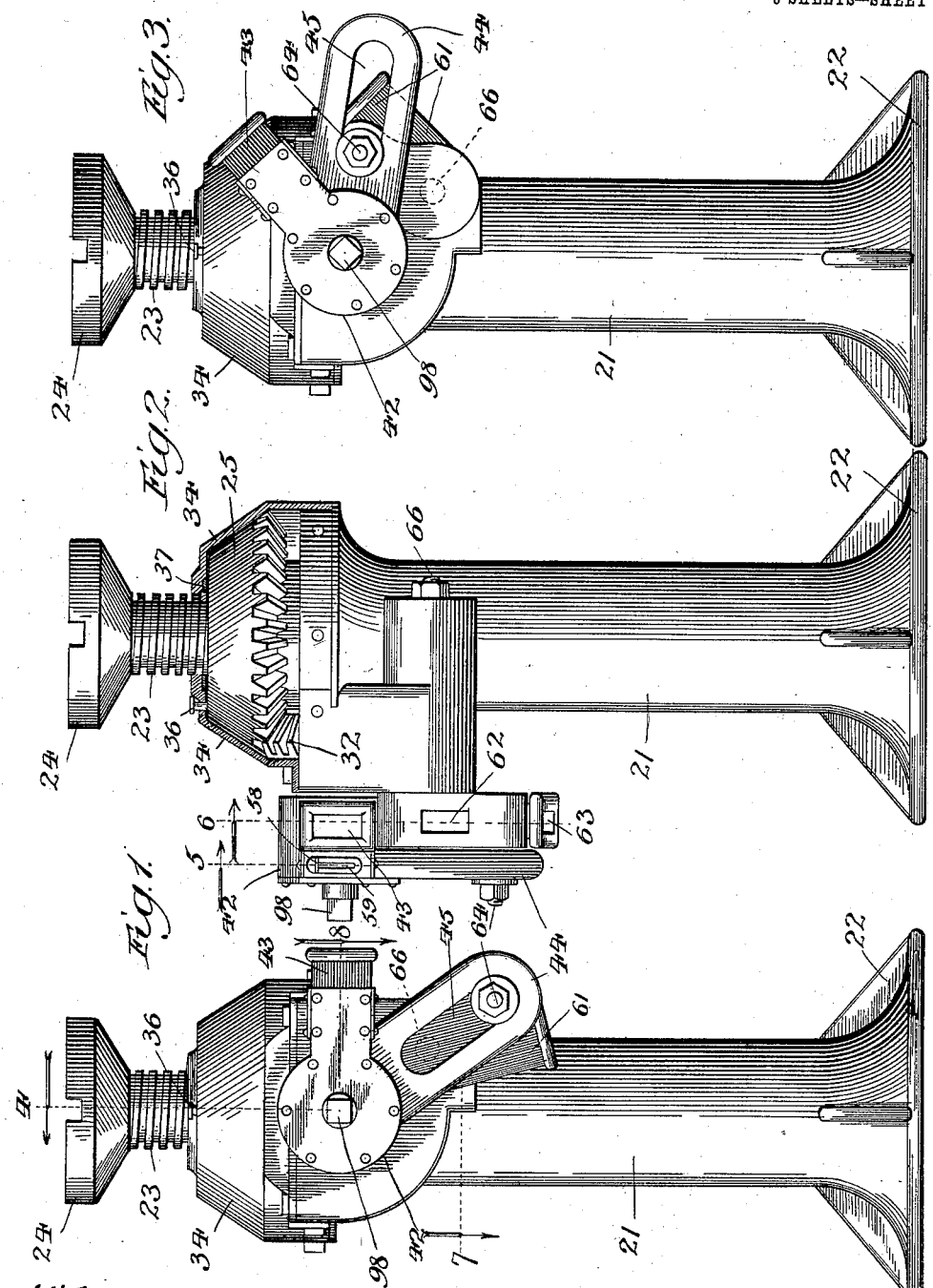

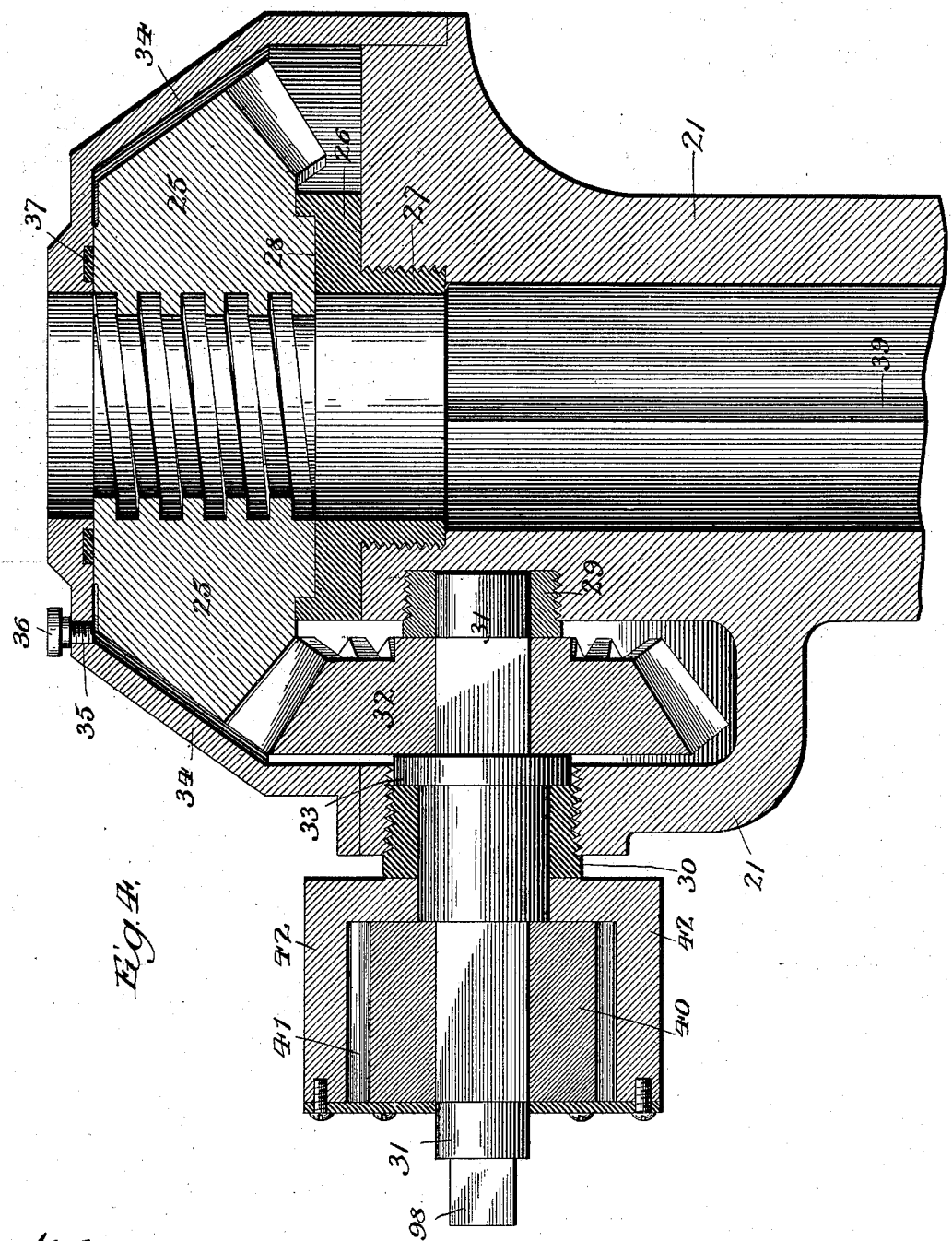

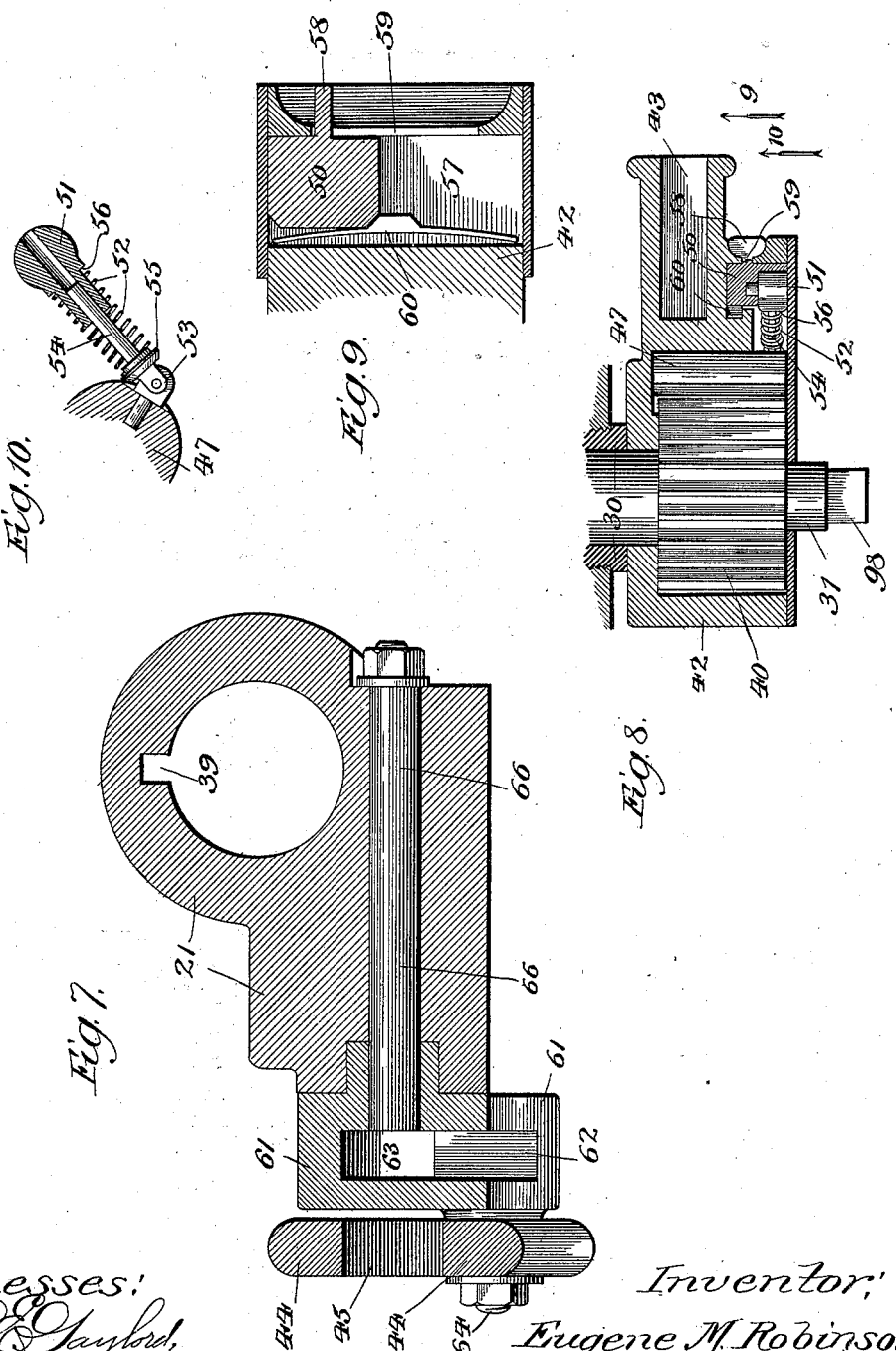

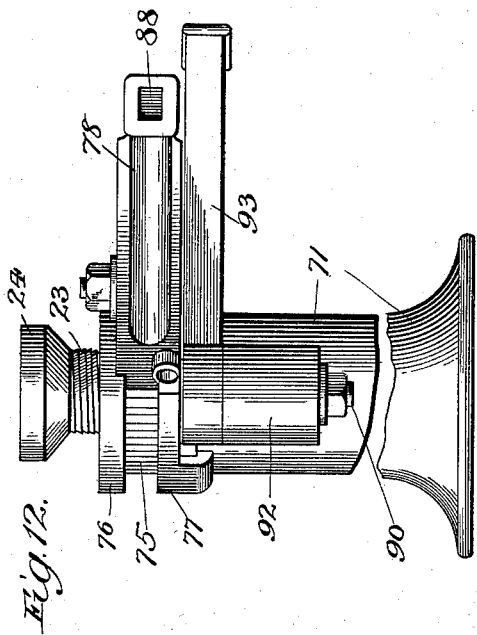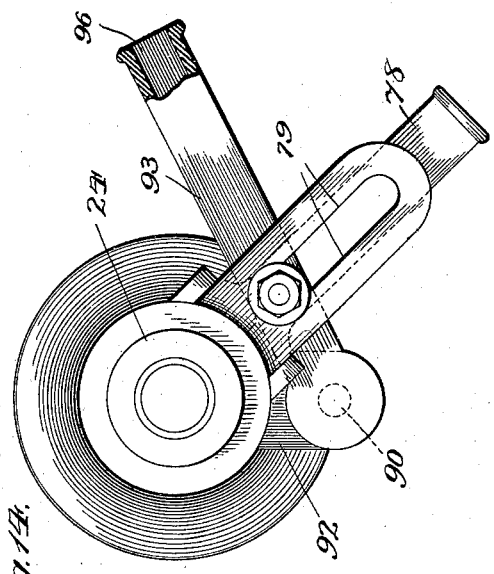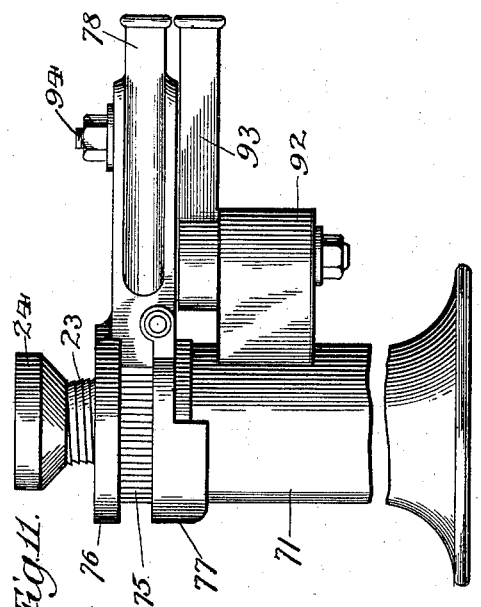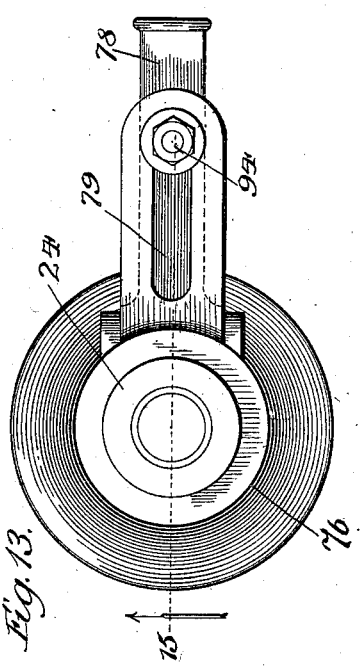

No. 756,982. PATENTED APR. 12, 1904.
E. M. ROBINSON.
VARIABLE POWER LIFTING JACK.
APPLICATION FILED APR. 6, 1901.
NO MODEL. 6 SHEETS—SHEET 6.
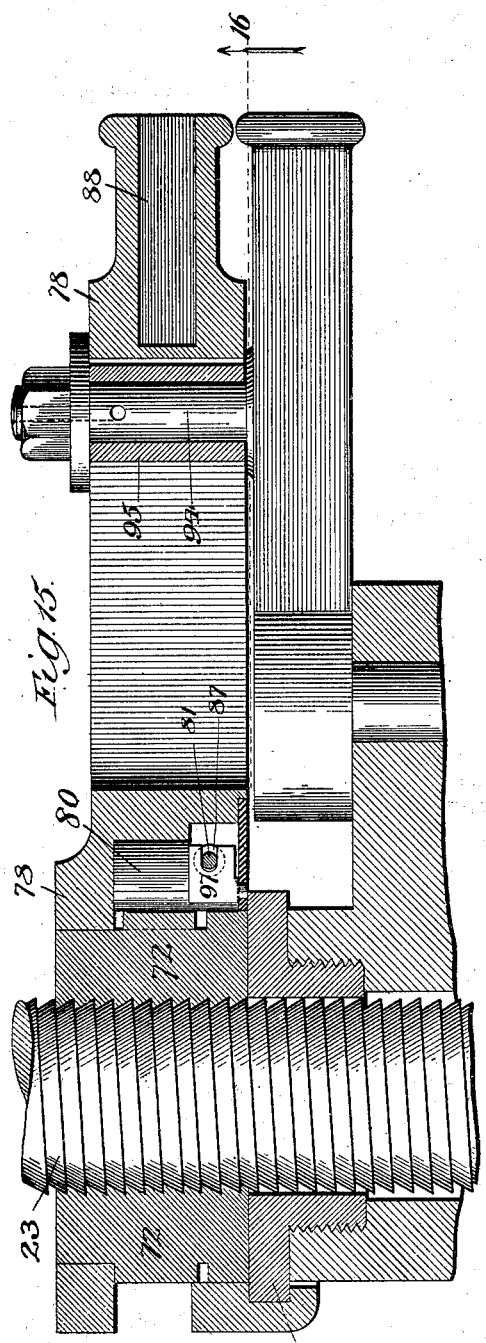
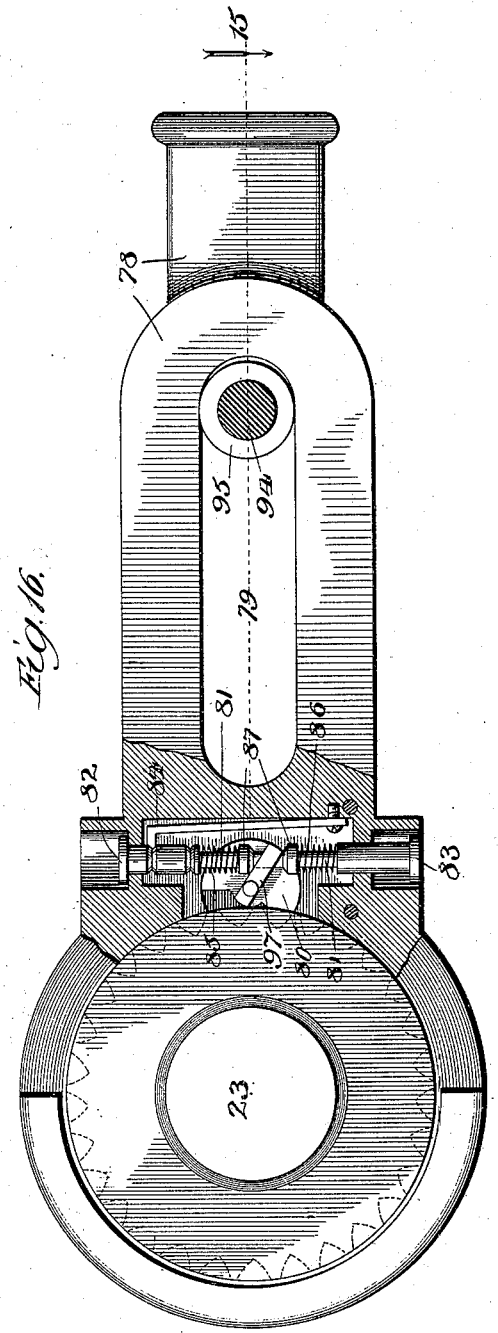
Witnesses:
Chas. E. Gaylord,
Lute Salter.
Inventor:
Eugene M. Robinson,
By Dwight B. Cheever
Att'ys.

No. 756,982.

Patented April 12, 1904.

UNITED STATES PATENT OFFICE.

EUGENE M. ROBINSON, OF CHICAGO, ILLINOIS, ASSIGNOR TO HIMSELF, AND WILLIAM H. FINLEY, OF WINNETKA, ILLINOIS.

VARIABLE-POWER LIFTING-JACK.

SPECIFICATION forming part of Letters Patent No. 756,982, dated April 12, 1904.

Application filed April 6, 1901. Serial No. 54,714. (No model.)

*To all whom it may concern:*

Be it known that I, EUGENE M. ROBINSON, a citizen of the United States, residing at Chicago, in the county of Cook and State of Illinois, have invented a new and useful Variable-Power Lifting-Jack, of which the following is a specification in its best form now known to me, reference being had to the accompanying drawings, in which similar numerals indicate the same parts throughout the several views.

My invention relates to lifting-jacks, and particularly to those in which the power and speed of lift can be varied.

The object of my invention is to provide a jack of neat, compact, rigid, yet cheap construction, which while efficient in operation will enable the operator to lift different loads at corresponding rates of speed in either direction.

My invention consists in a jack having the above qualifications, and it also consists in many details of construction hereinafter more fully described and claimed.

In the drawings, Figure 1 is a side view of my jack in its preferred form. Fig. 2 is a front view of the same, showing part of the case removed. Fig. 3 is a side view showing the parts in a different position from Fig. 1. Fig. 4 is a detail sectional view with the screw removed, taken on line 4 of Fig. 1. Figs. 5 and 6 are detail views on the corresponding lines of Fig. 2. Figs. 7 and 8 are sectional views on the corresponding lines of Fig. 1. Figs. 9 and 10 are detail views of the mechanism for shifting and controlling the pawl looking at the same in the direction indicated by the arrows marked 9 and 10 in Fig. 8. Figs. 11 and 12 are front and Figs. 13 and 14 corresponding plan views of a modified form of my jack, showing different positions of the levers. Fig. 15 is a sectional detail view on line 15 of Fig. 13. Fig. 16 is a detail bottom view of the pawl adjustment, taken on line 16 of Fig. 15.

The preferred form of jack, which is illustrated in Figs. 1 to 10, has a frame-casting 21 rising from the base 22. In the center of the frame 21 is the lifting-screw 23, having rigidly secured to its top the head 24, adapted to bear against the load to be lifted. Running on the threads of screw 23 is the bevel-gear 25. This gear is seated and journaled against the bearing-plate 26, which is screwed in frame 21 by the screw-threads 27. Ball or cone bearings may be introduced between the gear 25 and the bearing-plate 26 on the line 28, if desired. Journaled in the bushings 29 and 30, screwed into the frame 21, is the shaft 31, having rigidly attached to it the bevel-gear 32, meshing with gear 25. As shown, this shaft 31 is at right angles to the axis of the screw 23. The gear 32 is held in proper adjustment by a collar 33. On the end of shaft 31 is a square portion 98, adapted to have a wrench fit over it. It is manifest that a worm may be substituted for the bevel-gears above described, if desired. The gears above described are covered by a cap 34 which makes a tight fit with frame 21, so that the space in which the gears are located can be filled with oil. The oil can be inserted through the hole 35, which is normally closed by the set-screw 36. The space between the cap 34 and the gear 25 is closed by the packing-ring 37, fitted between the two. As the head 24 is rigidly secured to the screw 23, the screw does not turn on its axis when there is a load on the head 24. In order to prevent the screw turning on its axis when there is no load on it and also to increase the rigidity of the jack at all times, I secure a pin near the bottom of the screw. As the screw moves up and down this pin travels up and down in the groove 39 cut in the frame, and thus prevents the screw from turning on its axis. Making the jack with the lifting-screw and the shaft 31 bearing in the same frame-casting 21 has the advantage of keeping the gears 25 and 32 always in the proper mesh, thereby increasing the efficiency of the jack and doing away with the tendency to tear apart and bind, which is always present when gears are journaled in different castings. Rigidly secured to the outer end of shaft 31 is a ratchet-wheel 40, having its teeth 41 shaped substantially as shown in Fig 5. Journaled on the shaft 31 and incasing the ratchet-wheel 40 is the lever 42, having in it the socket 43, adapted to receive a lever-handle to be used by the workman. Extending from and integral with the lever 42 is an arm 44, having cut in it a slot-cam 45. Pivoted at 46 in the lever 42 is the pawl 47, having teeth 48 and 49, adapted to engage teeth 41 of the ratchet-wheel when the load is moved in different directions. This pawl is of more compact and neater construction than those heretofore made and consists of a circular rod, cut away, as shown, to form the teeth 48 and 49, and is pivoted or journaled by being simply inserted in a hole bored in the lever 42, as shown. This construction does away with all bulky levers and strong pivots heretofore necessary in double-acting pawls. Pivotally socketed in the block 50 is the head 51 of a spring-link 52, connected at 53 to the pawl 47. This spring-link consists of a rod 54, adapted to slide in the head 51, the two being kept apart by the spring, as shown, bearing against the shoulders 55 and 56. The block 50 is mounted in the space 57 within the lever 42, so that it can slide vertically, and has attached to it the handle 58, extending through a slot 59. The block 50 is held in position at either end of the space 57 by the spring 60. It will be seen from an inspection of the drawings that when the block 51 is in its upper position, as shown in Fig. 5, the spring-link 54 holds the pawl 47 in the position shown, so that tooth 48 operates on the ratchet 40 when the lever 42 is moved downward and clicks idly over the ratchet-wheel when it is moved upward. When block 50 is moved down to the bottom of space 57, the spring-link 52 is compressed until after the middle of the space 57 is passed, when the link reverses the pawl and causes tooth 49 to engage the ratchet 40. In this position the pawl acts, when the lever 42 is moved upward, the tooth 49 of the pawl clicking idly over teeth 41 of the ratchet-wheel 40 when the lever is moved downward.

Pivoted at 66 to the frame 21 at a distance from the pivot 98 less than the length of the main lever is an auxiliary lever 61, having two lever-handle sockets 62 and 63 and a pin 64 extending from it, carrying a roller 65, adapted to travel backward and forward in the slot 45. This auxiliary lever has as its journal the bolt 66, which passes through the frame 21 in the manner shown in Fig. 7. Manifestly the shape of the cam-slot 45 may be varied and it may be cut in lever 61, while the pin 64 is rigidly secured to the lever 42, without departing from my invention.

The operator desiring to use my jack places it so that the head 24 bears against the load. If the screw has to be moved any considerable distance to bring it in contact with the load, the workman places a crank-wrench on the end 98 of shaft 31 and turns the shaft rapidly in the direction desired, the pawl 47 clicking idly over the teeth of ratchet-wheel 40. He can of course move the screw rapidly in the other direction by simply reversing the pawl in the manner heretofore described. If the load is a light one, he places the lever-handle (not shown) in the socket 43 and pumps up and down. This causes ratchet 40, shaft 31, and gears 32 and 25 to rotate, and thus move screw 23 and the load upon it. If he desires to lower the load, he takes hold of handle 58 and reverses the pawl 47 in the manner heretofore described, thereby reversing the motion of the above-mentioned parts and lowering the load. During the progress of the above operations the roller 65 has been idly traveling backward and forward in the slot 45.

If the load is too heavy to be lifted by the use of the direct-action lever 42 in the manner just described, the workman removes his lever-handle from socket 43 and inserts it in socket 62, thereby operating lever 61 and applying power to lever 42 and thence to the screw through the roller 65, sliding in the slot 45. In this position, with the roller at the outer end of slot 45, the load which can be lifted by the jack with a given power applied is increased to about twice what it is when the lever 42 is used directly, the speed of lift being correspondingly reduced. By shifting the angle at which the lever-handle is worked, thereby changing the distance from the center of ratchet-wheel 40 at which the pin 64 and roller 65 work, and by finally shifting the lever-handle to socket 63 the power applied may be still further increased to about four times that of the direct lever 42. The position of the parts for this maximum power is illustrated in Fig. 3.

The preferred form of jack is one in which the lever-handle has a vertical pumping motion, as heretofore described; but my invention may also be applied to a jack in which the working lever has a horizontal motion. Such a jack is illustrated in the modified form of construction shown in Figs. 11 to 16. In this construction I mount the screw 23, having the head 24, in a frame 71. On screw 23 is a nut 72, turning on the bearing-plate 74 and having on its outer edge the ratchet-teeth 75, shaped like the ratchet-teeth 41, heretofore described. Loosely inclosing this nut 72 are the collars 76 and 77, integral with the direct lever 78. In this lever 78 is the slot 79. Pivoted within this lever is a pawl 80, shaped like the pawl 47, heretofore described. This pawl 80 is connected to a plunger 81, passing through the lever in the manner shown in Fig. 16. On the ends of this plunger are handles 82 and 83, and the plunger is held in position at either end of its stroke by the spring 84. The pawl 80 is normally operated in its work by either the spring 85 or the spring 86, according to whether the pawl is being used in lifting or lowering the load. As shown, these springs bear directly against collars 87, which bear against a fork 97, integral with the pawl 80. The plunger-rod 81 slides through this fork 97. When the operator desires to move the screw of the jack in one direction, he sets the pawl with the plunger 81 at one end of its stroke, as shown in Fig. 16. When it is desired to reverse the action of the jack, the workman presses on handle 83 and shoves plunger 81 to the opposite end of its stroke, thereby reversing the pawl. In the end of lever 78 is a socket 88, adapted to receive the end of the operating-lever handle or pole. Pivoted at 90 to a lug 92 on the side of the frame 71 is an auxiliary lever 93, having on it a stud 94, carrying the roller 95, running in the slot 79. In the end of this lever is another socket, 96, adapted to receive the end of the operating-lever handle. In the operation of this modified form of jack if the load is a light one the workman places the lever-handle in the socket 88 in lever 78 and gives it a horizontal pumping motion. In moving the lever in one direction the pawl 80 engages the teeth of nut 72 and rotates it, thereby moving the screw 23 and the load upon it upward. As the lever is moved in the other direction the pawl clicks idly over teeth 75. If he desires to reverse the direction of motion of the load, he simply reverses the pawl in the manner heretofore described. While the jack has been operated as just described the stud 94 and roller 95 have been moving idly backward and forward in slot 79. When the load is too heavy for the direct lever 78, the workman shifts this operating-handle to the socket 96. By then swinging the handle around so that the auxiliary lever 93 is at an angle to the main lever 78, as shown in Fig. 14, he obtains the increased power in substantially the same manner as with the preferred form heretofore described.

By the use of either construction I provide a jack of very simple construction in which the power, and consequently the speed of the jack, can be easily varied through a large range. These jacks are neat and compact in construction and efficient in operation. They are not liable to get out of order, and they possess a distinct advantage in that the operating-lever remains at a fixed distance from the ground instead of moving up and down with the screw, as it does in many forms of jack heretofore constructed. I do not limit myself to the exact details of construction, which may be varied within wide limits without departing from my invention.

Having thus described my invention, what I claim as new, and desire to secure by Letters Patent, is—

1. In a lifting-jack, the combination of the frame of the jack, lifting mechanism, a main lever adapted to operate the said lifting mechanism, an auxiliary lever pivoted at the end to the frame at a distance from the pivotal point of the main lever less than the length of the main lever, and a connection between the said levers secured to one lever at a fixed point adapted to slide along the other lever, for the purposes set forth.

2. In a lifting-jack, the combination of the frame of the jack, lifting mechanism, a main lever adapted to operate said lifting mechanism, an auxiliary lever pivoted at a distance from the pivotal point of the main lever less than the length of the main lever, a connection between said levers secured to one lever at a fixed point and adapted to slide along the other lever, and means for detachably securing a working handle to each of the said levers.

3. In a lifting-jack, the combination of a frame, a lifting-screw, a ratchet-wheel adapted to transmit power to said screw, a main lever adapted to operate said ratchet-wheel, an auxiliary lever pivoted at its end to the frame at a distance from the pivotal point of the main lever less than the length of the main lever, and a connection between the said levers secured to one lever at a fixed point and adapted to slide on the other lever for the purposes set forth.

4. In a lifting-jack, the combination of a frame, a lifting-screw, a ratchet-wheel adapted to transmit power to said screw, a main lever adapted to operate said ratchet-wheel, an auxiliary lever pivoted to the frame at its end at a distance from the pivotal point of the main lever less than the length of the main lever, a connection between the said levers rigidly secured to one lever and adapted to slide on the other lever, and means for detachably securing a working handle to each of said levers.

5. In a lifting-jack, the combination of the frame of the jack, a lifting-screw, a main lever adapted to operate said lifting-screw, connecting mechanism between the said lever and said screw, an auxiliary lever pivoted at its end to the frame at a point distant from the pivotal point of the main lever less than the length of the main lever, a pin or stud on one of the said levers entering a cam-slot in the other lever, and means for detachably securing a working handle to said levers, for the purposes set forth.

6. In a lifting-jack, in combination with the frame of the jack, a lifting-screw, means for securing said screw against rotation while permitting it to move up and down, a nut or wheel upon said lifting-screw, a main lever having a ratchet connection with said nut or wheel, an auxiliary lever pivoted at its end to the frame at a distance from the pivotal point of the main lever less than the length of the main lever, a pin or stud on one of said levers entering a cam-slot in the other lever, and means for detachably securing a working handle to said lever, for the purposes set forth.

7. In a lifting-jack, in combination with the frame, a lifting-screw adapted to move up and down in the frame, means for preventing the screw from turning on its axis, a bevel-gear threaded on said screw, a shaft journaled in the frame at right angles to the screw, another bevel-gear on said shaft meshing with the first bevel-gear, a ratchet-wheel on said shaft, a main lever, a pawl on said lever engaging said ratchet-wheel, means for reversing said pawl so that the direction of the motion of the screw is reversed, an auxiliary lever pivoted at its end to the frame at a distance from the pivotal point of the main lever less than the length of the main lever, and a connection between said levers secured to one lever at a fixed point and adapted to slide along the other lever for the purposes set forth.

8. In a lifting-jack, in combination with the frame of the jack, a lifting-screw adapted to move up and down in the frame, means for preventing the screw from turning on its axis, a bevel-gear threaded on said screw, a shaft journaled in the frame at right angles to the screw, another bevel-gear on said shaft meshing with the first bevel-gear, a ratchet-wheel on said shaft, a main lever, a pawl on said lever engaging said ratchet-wheel, means for reversing said pawl so that the direction of motion of the screw is reversed, an auxiliary lever pivoted at its end to the frame at a distance from the pivotal point of the main lever less than the length of the main lever, an elongated slot in one of said levers, a pin or stud in the other lever adapted to slide backward and forward in the said slot, and means for detachably securing working handles in said levers for the purposes set forth.

9. In a lifting-jack in combination with the frame, a lifting-screw adapted to move up and down, means for preventing the screw from turning on its axis, a bevel-gear threaded on said screw, a shaft journaled in the frame at right angles to the screw, another bevel-gear on said shaft meshing with the first bevel-gear, means for attaching a wrench to said shaft, a ratchet-wheel on said shaft, a lever journaled on said shaft, a pawl on the said lever engaging said ratchet-wheel, means for reversing said pawl so that the direction of the motion of the said screw is reversed, an auxiliary lever pivoted at its end to the frame at a point distant from the pivotal point of the main lever less than the length of the main lever, and a connection between the said levers secured to one lever at a fixed point and adapted to slide over the other lever, for the purposes set forth.

10. In a lifting-jack, the combination of the frame of the jack, lifting mechanism, a main lever adapted to operate said lifting mechanism, an auxiliary lever pivoted at its end to the frame at a point distant from the pivotal point of the main lever less than the length of the main lever, a cam-slot in the main lever and a pin on the auxiliary lever adapted to slide in the said slot, for the purposes set forth.

11. In a lifting-jack, the combination of the frame, the lifting-screw, a ratchet-wheel adapted to transmit power to said lifting-screw, a main lever adapted to operate said ratchet-wheel, an auxiliary lever pivoted at its end to the frame at a point distant from the pivotal point of the main lever less than the length of the main lever, a cam-slot in the main lever and a pin on the auxiliary lever adapted to slide in the said slot, for the purposes set forth.

12. In a lifting-jack, in combination with the frame of the jack, a lifting-screw, a main lever adapted to operate said lifting-screw, connecting mechanism between said lever and said screw, an auxiliary lever pivoted at its end to the frame at a point distant from the pivotal point of the main lever less than the length of the main lever, a cam-slot in the main lever, and a pin or stud on the auxiliary lever entering said slot, for the purposes set forth.

EUGENE M. ROBINSON.

Witnesses:
DWIGHT B. CHEEVER,
W. W. BURSON.